US009100455B2

(12) United States Patent
Li et al.

(10) Patent No.: US 9,100,455 B2
(45) Date of Patent: *Aug. 4, 2015

(54) METHOD AND APPARATUS FOR PROVIDING PROTECTION AGAINST SPAM

(71) Applicant: AT&T Intellectual Property I, L.P., Atlanta, GA (US)

(72) Inventors: Jian Li, Danville, CA (US); Zhi Li, San Ramon, CA (US); Raghvendra Savoor, Walnut Creek, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,553

(22) Filed: Jul. 12, 2013

(65) Prior Publication Data

US 2013/0301478 A1 Nov. 14, 2013

Related U.S. Application Data

(63) Continuation of application No. 12/340,487, filed on Dec. 19, 2008, now Pat. No. 8,488,479.

(51) Int. Cl.
| | |
|---|---|
| *H04L 12/26* | (2006.01) |
| *H04L 12/56* | (2006.01) |
| *G06F 15/16* | (2006.01) |
| *G06F 21/00* | (2013.01) |
| *H04L 29/06* | (2006.01) |
| *H04M 3/436* | (2006.01) |

(52) U.S. Cl.
CPC .......... *H04L 63/306* (2013.01); *H04L 65/1079* (2013.01); *H04M 3/4365* (2013.01)

(58) Field of Classification Search
CPC ... H04L 12/585; H04L 43/028; H04L 47/803; H04L 47/2475; H04L 51/12; H04L 63/0227; H04L 63/0236; H04L 63/0245; H04L 63/0263; H04L 63/0281; H04L 63/10; H04L 63/14; H04L 63/20; H04L 63/107; H04L 63/145; H04L 63/306; H04L 63/1416; H04L 63/1425; H04L 63/1441; H04L 63/1458; H04L 63/1483; H04L 65/1076; H04L 65/1079; H04L 2463/14; G06F 17/30867; G06F 21/55; H04M 3/2281; H04M 3/4365; H04M 7/0078
USPC .............. 370/250, 252, 261, 310–357, 360, 370/400–401; 379/93.14, 115.03, 142.05, 379/201.05, 216.01, 221.02, 230, 266.1, 379/386; 709/206, 224, 227, 229, 232; 726/1–26
See application file for complete search history.

(56) References Cited

U.S. PATENT DOCUMENTS

| | | | |
|---|---|---|---|
| 7,027,463 B2 * | 4/2006 | Mathew et al. | ............... 370/463 |
| 7,181,764 B2 | 2/2007 | Zhu et al. | |

(Continued)

OTHER PUBLICATIONS

Defrawy et al., Optimal Filtering for DDoS Attacks, Dec. 2006, arXiv:cs/0612066v1 [cs.NI], pp. 1-13, (see U.S. Appl. No. 12/340,487).

*Primary Examiner* — Tri H Phan
(74) *Attorney, Agent, or Firm* — Wall & Tong, LLP (57) ABSTRACT

A method and apparatus for providing protection against spam calls are disclosed. For example, the method receives a signaling message for setting up a call to a customer, and determines whether the call is from a caller that has been identified as being a spammer. The method processes the call using one or more filter rules for the customer, if the caller has been identified as being a spammer.

20 Claims, 4 Drawing Sheets

(56) References Cited

U.S. PATENT DOCUMENTS

| | | |
|---|---|---|
| 7,587,760 B1 | 9/2009 | Day |
| 7,698,370 B1 | 4/2010 | Hall |
| 7,912,905 B2* | 3/2011 | Bhatia ............... 709/206 |
| 7,975,286 B1 | 7/2011 | Fickey et al. |
| 7,991,764 B2* | 8/2011 | Rathod ............... 707/713 |
| 8,135,022 B2* | 3/2012 | Sterman et al. ........ 370/401 |
| 8,141,152 B1 | 3/2012 | Hwang et al. |
| 8,285,269 B2* | 10/2012 | Worth et al. .......... 455/418 |
| 8,488,479 B2 | 7/2013 | Li et al. |
| 2003/0061506 A1 | 3/2003 | Cooper et al. |
| 2005/0132060 A1 | 6/2005 | Mo et al. |
| 2006/0256012 A1 | 11/2006 | Fok et al. |
| 2007/0121596 A1 | 5/2007 | Kurapati et al. |
| 2007/0150773 A1 | 6/2007 | Srivastava |
| 2008/0016579 A1* | 1/2008 | Pang ............... 726/26 |
| 2008/0126531 A1 | 5/2008 | Setia et al. |
| 2009/0064323 A1* | 3/2009 | Lin ............... 726/22 |
| 2009/0106318 A1 | 4/2009 | Mantripragada et al. |
| 2009/0144374 A1* | 6/2009 | Laborde ............ 709/206 |
| 2009/0158403 A1 | 6/2009 | Benschop et al. |
| 2010/0017476 A1* | 1/2010 | Shue ............... 709/206 |
| 2010/0153394 A1 | 6/2010 | Wood |
| 2010/0223349 A1* | 9/2010 | Thorson ............ 709/206 |
| 2011/0239295 A1 | 9/2011 | Sorge et al. |
| 2011/0276396 A1* | 11/2011 | Rathod ............. 705/14.49 |

* cited by examiner

METHOD AND APPARATUS FOR PROVIDING PROTECTION AGAINST SPAM

This application is a continuation of U.S. patent application Ser. No. 12/340,487, filed Dec. 19, 2008, which is currently allowed and is herein incorporated by reference in its entirety.

The present invention relates generally to protection of networks and, in particular, to a method and apparatus for providing protection against spam in networks, e.g., Internet Protocol (IP) networks, Voice over Internet Protocol (VoIP) networks, Service over Internet Protocol (SoIP) networks, etc.

BACKGROUND OF THE INVENTION

Much of today's important business and consumer applications rely on communications infrastructures such as the Internet. Businesses and consumers need to provide protection to their network from hostile activities while being able to communicate with others via the infrastructure. For example, businesses and consumers need to be able to send and receive voice and data packets. However, businesses and consumers also need to minimize the amount of unsolicited and undesirable content delivered to endpoint devices such as computers. The unsolicited and undesirable content is referred to as spam. For example, an undesirable and unsolicited email may be referred to as spam email. In another example, an undesirable and unsolicited voice call may be referred to as a spam voice call.

The protection of endpoint devices is typically accomplished by using a gateway or a dedicated application server to scan incoming packets and perform filtering prior to forwarding to the endpoint devices. For example, the gateway server or an email server may scan incoming emails, and redirect or remove spam emails (unsolicited and undesirable emails). Thus, the endpoint devices will not receive the spam emails.

However, some applications do not tolerate the delay associated with online scanning. For example, voice calls are typically processed in real time. For example, if a voice call is destined to a customer, then the call is forwarded towards the customer's endpoint device prior to scanning. Therefore, by the time any scanning of the content of a phone call is performed, the call has already reached the customer.

SUMMARY OF THE INVENTION

In one embodiment, the present invention discloses a method and apparatus for providing protection against spam calls. For example, the method receives a signaling message for setting up a call to a customer, and determines whether the call is from a caller that has been identified as being a spammer. The method processes the call using one or more filter rules for the customer, if the caller has been identified as being a spammer.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing protection against spam. Although the present invention is discussed below in the context of IP networks, the present invention is not so limited. Namely, the present invention can be used for other networks such as cellular networks, wireless networks and the like.

Furthermore, although the present invention is described below in the context of spam voice calls, the present invention is not so limited. For example, the present invention can also be implemented to address unwanted content for delay sensitive applications, or applications in which multiple levels of delay sensitivity may exist, such as multiple services provided over a Service over Internet Protocol (SoIP) network.

Figure 1:
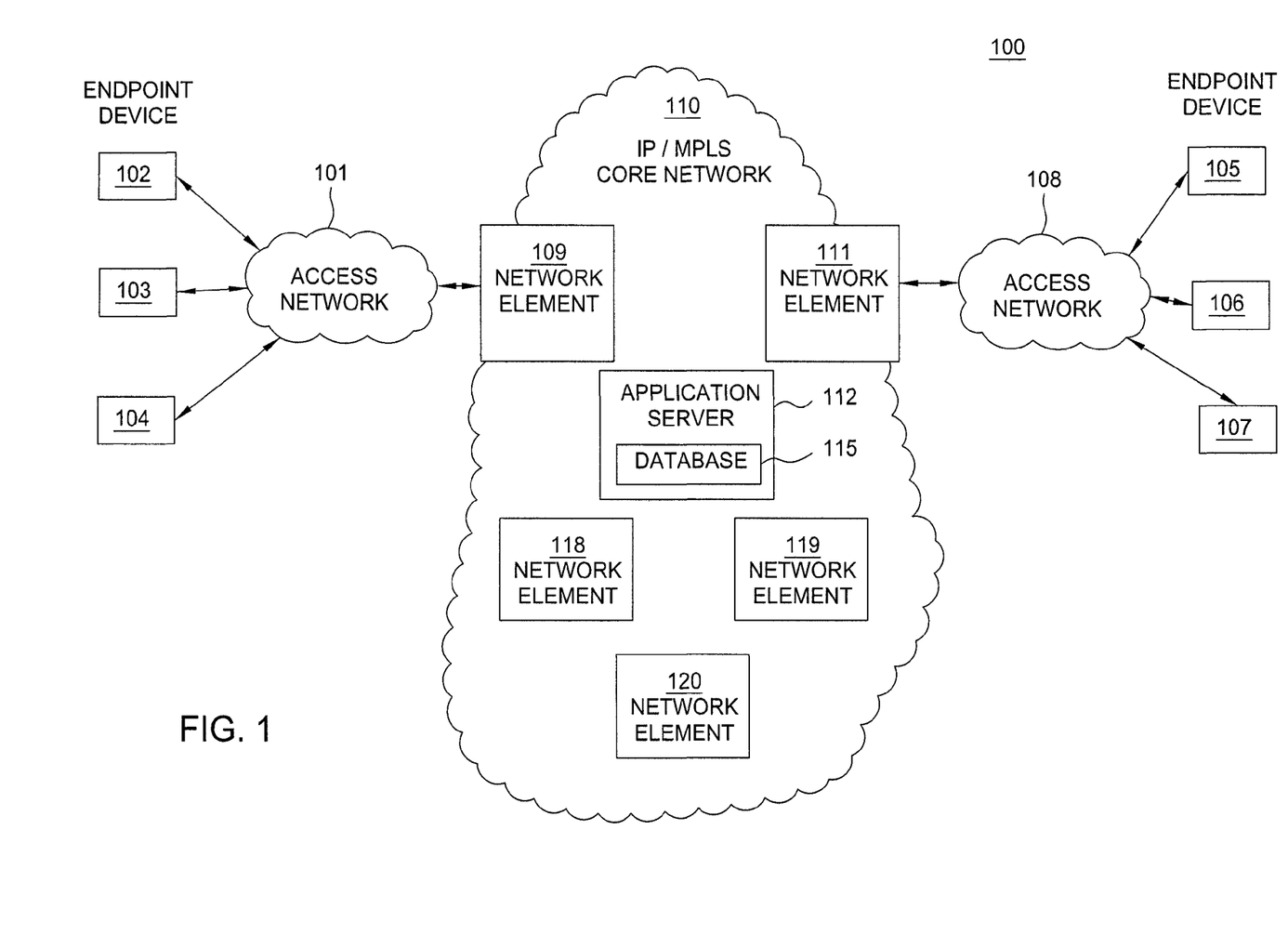
FIG. 1 illustrates an exemplary network related to the present invention.

FIG. 1 is a block diagram depicting an exemplary configuration of a communication system 100 constructed in accordance with one or more aspects of the invention. In one embodiment, a plurality of endpoint devices 102-104 is configured for communication with the core packet network 110 via an access network 101. Similarly, a plurality of endpoint devices 105-107 are configured for communication with the core packet network 110 (e.g., an IP based core backbone network supported by a service provider) via an access network 108. The network elements 109 and 111 may serve as gateway servers or edge routers for the network 110.

The endpoint devices 102-107 may comprise customer endpoint devices such as personal computers, laptop computers, personal digital assistants (PDAs), servers, and the like. The access networks 101 and 108 serve as a conduit to establish a connection between the endpoint devices 102-107 and the network elements 109 and 111 of the core network 110. The access networks 101, 108 may each comprise a digital subscriber line (DSL) network, a broadband cable access network, a local area network (LAN), a wireless access network (WAN), the Internet, and the like. Some network elements (e.g., NEs 109 and 111) reside at the edge of the core infrastructure and interface with customer endpoints for signaling and routing purposes over various types of access networks. An NE is typically implemented as an edge router, a media gateway, a border element, a firewall, and the like. An NE may also include a component that resides within the network (e.g., NEs 118-120) such as a mail server, a honeypot, a tarpit, or like devices. The core network 110 may also comprise an application server 112 that contains a database 115. The application server 112 may comprise any server or computer that is well known in the art, and the database 115 may be any type of electronic collection of data that is well known in the art. (See also FIG. 4). Those skilled in the art will realize that although only six endpoint devices, two access networks, and five network elements (NEs) are depicted in FIG. 1, the communication system 100 may be expanded by including additional endpoint devices, access networks, and network elements without altering the present invention.

The above IP network is described to provide an illustrative environment in which voice, data and video packets can be transmitted on communication networks. For example, businesses need to be able to communicate with customers, suppliers, and etc. via electronic mail, voice call, and the like. However, businesses want to minimize the amount of unsolicited and undesirable content (also known as spam) delivered to their endpoint devices such as computers, laptops, personal digital assistants (PDAs), mobile phones and the like. The protection of endpoint devices may be accomplished by using a gateway server and/or a dedicated application server to scan all incoming packets and perform filtering of spam prior to forwarding to the endpoint devices.

For example, an email server may scan incoming emails and redirect or remove the spam emails. Scanning incoming emails prior to forwarding to the destination endpoint device introduces a delay. Thus, a customer may weigh the benefit of scanning and filtering incoming emails against the cost of delaying the emails. Unfortunately, some applications may not tolerate the delay associated with the online scanning of content. For example, voice calls are typically processed in real time. For example, if a service provider, e.g., a VoIP service provider, receives a voice call destined to a customer, the service provider will forward the call towards the customer's endpoint device in real time before any content based scanning and filtering can be performed. In other words, a customer expects calls to be forwarded by the service provider immediately without delay. As a result, customers may receive spam voice calls.

In one embodiment, the current invention provides a method and an apparatus for providing protection against spam voice calls. For example, the current method provides a centralized application server in the service provider's network that identifies and maintains a list of spammers. The application server may gather spam reports/feedback from the one or more edge access routers (further described below). The application server may then identify VoIP call spammers by processing the gathered spam reports and performing correlations. For example, if a pre-determined number of customers (e.g., 100 customers, 1000 customers and so on) report a call from a specific calling party (e.g., an Internet Protocol (IP) address or a phone number) as being a spam call, the application server may then gather inputs from the customers and be able to identify the caller in the future as being a spammer. In turn, the spammer's phone number and/or IP address may then be added to a list of known spammers maintained by the application server.

In one embodiment, the current method also provides one or more signaling gateway routers at the edge of the service provider's network. The signaling gateway routers are used for receiving signaling messages from the customer endpoint devices and/or for forwarding signaling messages from Call Control Elements (CCEs) to the customer endpoint devices. For example, if a call is initiated by the customer, the SIP gateway server may receive the signaling message from the customer. The SIP gateway may then forward the signaling message towards the CCE. The CCE may then determine the routing information for the destination address and forward the signaling message accordingly.

In one embodiment, the current method also provides edge access routers for providing media path between calling and called parties. That is, if the call is successful, a media path is established between the calling and called parties traversing the edge access routers. For example, the signaling messages for establishing a call between a calling and a called party may traverse the SIP gateway routers while the media path traverses the edge access routers. In one embodiment, the edge access router is in communication with the signaling gateway router that handles the call. For example, the edge access router for the called party is in communication with the SIP gateway router handling the signaling message for the called party. Once the media path is established, the calling and called parties may then send and receive voice packets.

In one embodiment, the method allows a customer via an endpoint device to provide feedback to the centralized application server (described above). The customer endpoint device communicates with the service provider's network through a signaling gateway router and an edge access router located at the edge of the service provider's network. For example, signaling messages from the customer endpoint device may reach the signaling gateway router in the service provider's network via the Internet. Similarly, media packets from the customer endpoint device may reach the edge access router in the service provider's network via the Internet.

In one embodiment, the current method provides a spam call filter in one or more signaling gateway routers, such as SIP gateway routers. The signaling gateway router that handles the signaling messages to/from a customer's endpoint device may perform spam call filtering for the customer. In one embodiment, the customer may provide the signaling gateway router with one or more filter rules to be applied to the incoming calls. For example, the customer may provide a filter rule that requests that a spam rating and/or category (e.g., telemarketer, charitable organization, etc.) associated with an incoming call, if available, be displayed on a customer's endpoint device. In other words, if an incoming call has been identified by the signaling gateway router as being a potential spam call, then the signaling gateway router will forward the call to the customer endpoint device along with the information that can be displayed on the customer endpoint device showing a spam rating, e.g., 1-10, where 10 represents a very high probability that the call is a spam call.

In another example, the filter rule may specify that calls originating from an IP address that is being used by one or more spammers be blocked. For example, over a period of time, a service provider may deduce (e.g., from inputs received from a plurality of users, or inputs from other service providers) that an originating IP address is associated with a spammer. As such, when an incoming call from the spammer identified by its IP address is directed to the customer, a filter rule specified by the customer may cause the incoming call to be blocked.

Thus, in one embodiment, the filtering of spam call (e.g., performed by the signaling gateway router) may then be based on the one or more filter rules received from the customer. For example, when a signaling gateway router or a SIP gateway router receives a call destined towards a customer, the signaling gateway router or may perform filtering actions in accordance with the customer's filter rules.

In one embodiment, the signaling gateway router queries the centralized application server to determine if a call is from a spammer. If the call is not identified as being from a spammer, the call may then be forwarded towards the customer endpoint device. If the call is from a spammer, the signaling gateway router may provide the customer with additional information pertaining to the call, e.g., a spam rating and/or a category of the call. For example, the signaling message for setting up the call may include the spam rating and/or the category. The customer may then view the rating and/or the category of the call on the display of the endpoint device and will be able to make an informed decision whether to answer the call.

In one alternate embodiment, the signaling gateway router is able to determine if a call destined towards a customer is from a spammer by analyzing information contained within the signaling message. In other words, the signaling gateway router does not directly query the centralized application server as discussed above. Instead, the CCE may first query the centralized application server prior to forwarding the signaling message towards the gateway router. The response to the query may then be used by the CCE to determine whether or not the call is from a spammer and the signaling message sent to the signaling gateway router is adjusted accordingly.

In one embodiment, the response to the query by the centralized application server may comprise more refined spammer information, e.g., a rating of a spammer, a category of a spammer (e.g., a telemarketer for a type of good or service, a political organization, or a charitable organization), and so on. If the call is from a spammer, the CCE may then forward the signaling message and/or spammer information towards the signaling gateway router. For example, the signaling message from the CCE to the SIP gateway router may indicate that the call is from a spammer and the spammer is known to be a telemarketer for a credit card company. The SIP gateway router may then handle the call in accordance with the customer's filter rules.

For example, a filter rule from the customer may specify blocking all spam calls. In another example, the filter rule may specify blocking spam calls of a specific category, e.g., from telemarketers, but not from charitable organizations. In another example, the filter rule may specify a time of day or a day of week for handling such spam calls. For example, the filter rule may block all spam calls from 7:00 pm to 7:00 am, or the filter rule may block all spam calls for Saturday and Sunday, and so on.

Once a call destined towards a customer is established, the customer may subsequently determine from the conversation that the call is a spam call, i.e., from a spammer. The customer may then provide a feedback to the service provider indicating that the call is a spam call. For example, the customer may enter a code via a telephone keypad (real or virtual) to activate reporting of a spam call. In another example, the endpoint device may have a dedicated spam reporting button (key) and/or a software component that enables the customer to input information that identifies a phone call as a spam call. The signaling for the feedback is transmitted towards the signaling gateway router handling the call.

In one embodiment, the current method also provides a call recording system in one or more edge access routers. For example, if a called party identifies a call as a spam call, the SIP gateway router for the called party may redirect the call to the edge access router for the called party. The edge access router may then capture a predetermined amount of the signaling and data packets for analysis. For example, the edge access router may record the SIP packets (if SIP signaling is used) and the voice packets in the call recording system. In one embodiment, the recorded information by the call recording system may comprise one or more of: the source of the call, e.g., an IP address, the route used by the call, a rating of the content of the call (broadly a spam rating), a category of the spam content (e.g., the type of organization or the intention of call) and a predetermined amount of voice packets (e.g., to deduce the length of the spam call, if the spam call is a pre-recorded message).

In one embodiment, the edge access router may then provide a spam report to the centralized application server that maintains the list of spammers. The application server may gather the spam reports and perform correlations to identify and maintain the list of spammers. As described above, the signaling gateway router may then use the list of spammers in conjunction with the filter rules received from the customer, to filter any spam calls.

In one embodiment, the above application server that identifies spammers and maintains the list of spammers may identify a foreign gateway from which multiple VoIP spam calls have been reported as being a gateway used by one or more spammers and add it to the list of spammers. For example, the application server may identify the foreign gateway as a spammer in the same way it identifies an individual IP address or phone number.

In one embodiment, the above customer endpoint device may comprise a display for showing a spam rating and/or a spam category of an incoming call. For example, the phone may have a display that shows that the caller is identified as a telemarketer.

In one embodiment, the display for showing a spam rating and/or category may be configurable by the customer. For example, the customer may wish to block calls only from a specific category of spammer. For example, the customer may wish to block calls from telemarketers while receiving calls from charitable organizations, political campaigns, etc. In another example, the customer may wish to block spam calls that originate outside of a specific area, e.g., all spam calls originating from a foreign country.

In one embodiment, the rules for displaying, filtering and reporting of a spam call are configurable by the customer. For example, a customer may wish to block all potential spam calls. Alternatively, a customer may wish to reduce the chance of non-spam calls from being blocked, by allowing calls from source addresses that may originate both spam and non-spam calls to be accepted. For example, a foreign gateway may be used for spam or non-spam calls. Therefore, a customer with a filter rule that blocks all calls from a specific foreign gateway, may cause non-spam calls routed through the same foreign gateway to be blocked unnecessarily.

Figure 2:
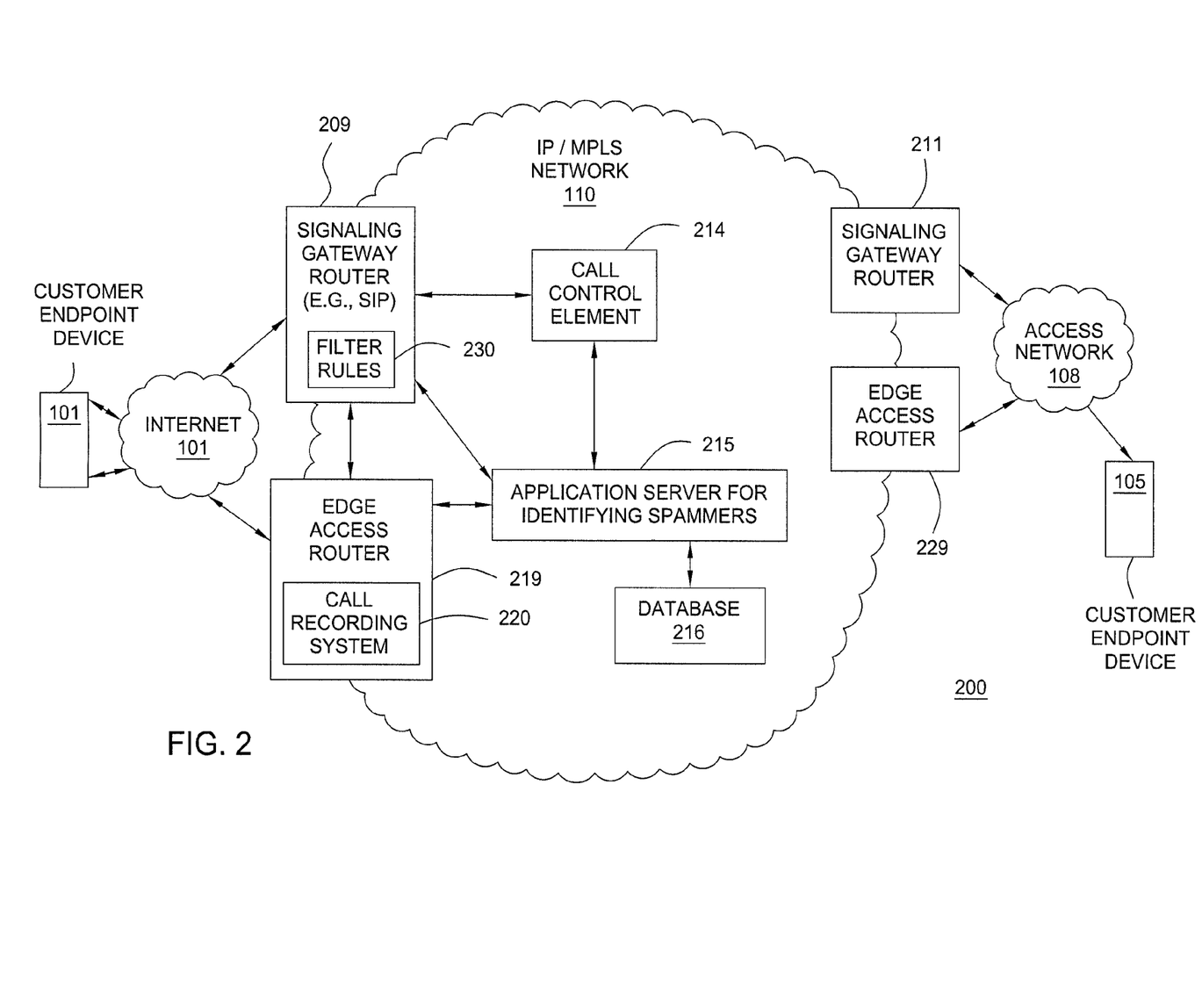
FIG. 2 illustrates an exemplary network for providing protection against spam.

FIG. 2 illustrates an exemplary network 200 for providing protection against spam. In one embodiment, the network 200 comprises a customer endpoint device 102 accessing services from the IP/MPLS core network 110 through the Internet 101. The IP/MPLS core network 110 also comprises signaling gateway routers 209 and 211, edge access routers 219 and 229, a call control element 214, an application server 215 for identifying spammers and maintaining a list of spammers, and a database 216 for storing the list of spammers. In one embodiment, the application server 215 collects spam reports from the edge access routers 219 and 229 periodically. For example, the edge access router may periodically upload a list of spam calls, details of the spam call (e.g., category of spam call), etc. into the application server 215 and/or the database 216.

In one embodiment, signaling messages to/from the customer endpoint device 102 reach the IP/MPLS core network 110 via the internet 101 and the signaling gateway router 209. Media packets to/from the customer endpoint device 102 reach the IP/MPLS core network 110 via the Internet 101 and the edge access router 219. Similarly, the signaling gateway router 211 and the edge access router 229 are used for connecting to the customer endpoint device 105 via another access network 108.

In one embodiment, the edge access router 219 comprises a call recording system 220 and the signaling gateway router 209 comprises a database 230 for storing filter rules. The database 230 for filter rules may be used for providing customized spam filtering of incoming calls destined to the customer endpoint device 102. In one embodiment, the call recording system 220 is used to record SIP signaling and/or voice packets for calls that a customer has identified as being from a spammer.

In one example, if the IP/MPLS core network 110 receives a call towards the customer endpoint device 102, the call control element (CCE) 214 may receive the signaling message to setup the call. For example, if a call is originated by the customer endpoint device 105 towards the customer endpoint device 102, the call control element 214 may receive a SIP signaling message for setting up the call (if SIP is used). The call control element 214 determines the routing logic for the destination address and forwards the signaling message towards the signaling gateway router 209.

In one embodiment, when the signaling gateway router 209 receives the signaling message for the call destined to the customer endpoint device 102, the signaling gateway router 209 is able to determine if the call is from a caller identified as a spammer by the application server 215. In one embodiment, the CCE 214 may have already included the spamming related information (e.g., spammer rating and/or category) in the signaling message. In another embodiment, the signaling gateway router may actively query the application server 215 directly to obtain the spamming related information.

If the call is identified as being from a spammer, the signaling gateway router 209 retrieves the pertinent filter rules from database 230 and applies the customer's filter rules. The call may then be processed in accordance with the customer filter rules. In one example, the call may be forwarded to the customer along with spamming related information. In another example, the call may be blocked. If the call is not identified as being from a spammer, the signaling gateway router 209 simply forwards the call towards the customer endpoint device 102.

The customer may then receive the call and/or spammer related information (if applicable). If the customer determines that the received call is in fact a spam call, the customer may provide a feedback to the signaling gateway router. For example, the customer may press a spam reporting button or enter a special code (e.g., dialing *987 and so on) to report the spam call. The signaling gateway router may receive the feedback from the customer and engage the edge access router 219 to record the signaling message and/or voice content of the spam call in the call recording system 220. In turn, the edge access router 220 may then analyze the recorded signaling message and voice content, and issue a spam report to application server 215. For example, the spam report may include the caller's IP address, category of spammer (if provided by the customer), etc. The application server 215 may gather information from one or more edge access routers to identify spammers and update the database 216 accordingly.

Figure 3:
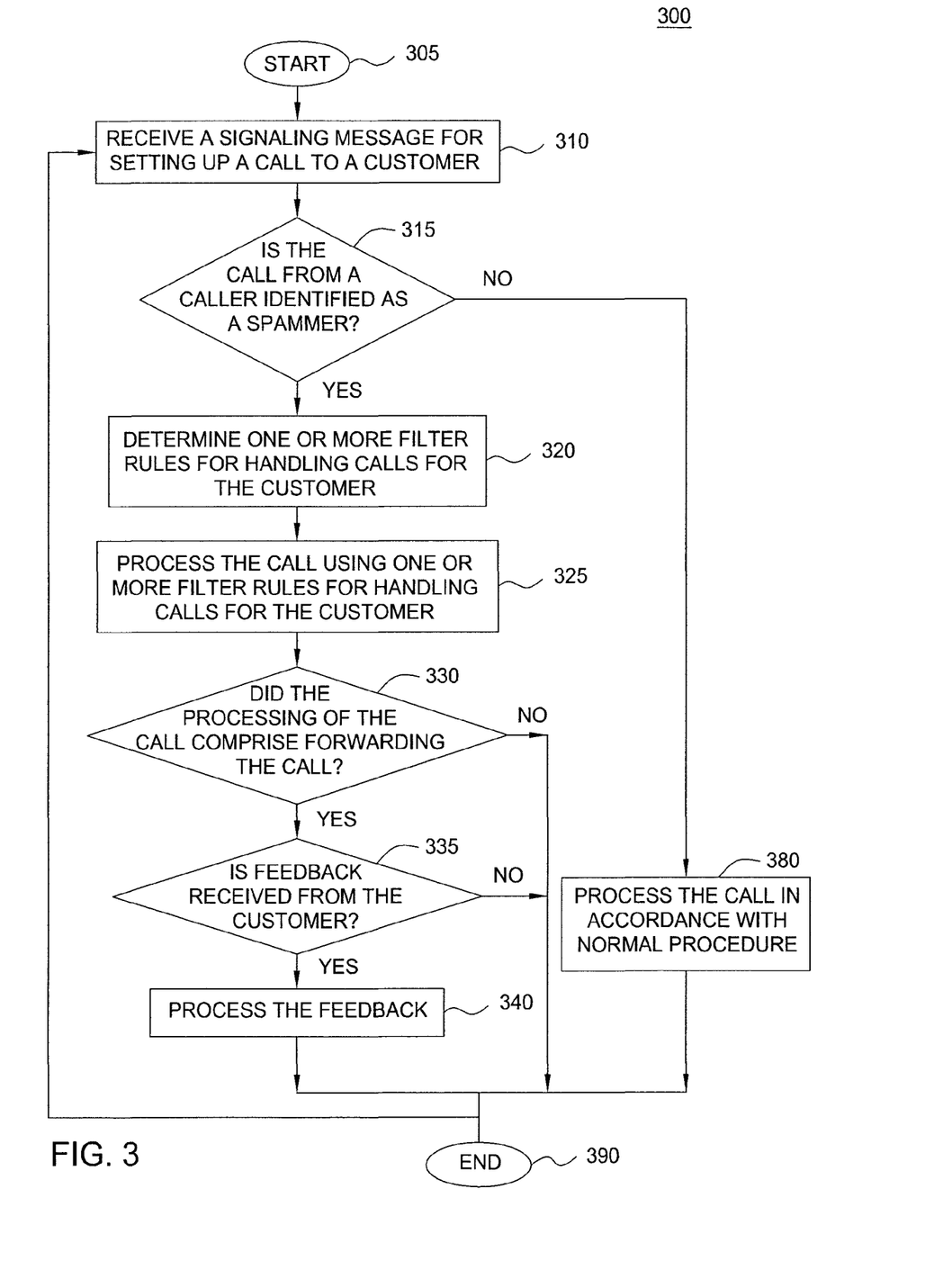
FIG. 3 illustrates a flowchart of a method for providing protection against spam.

FIG. 3 illustrates a flowchart 300 of the method for providing protection against spam. For example, one or more steps of method 300 can be implemented in a signaling gateway router. Method 300 starts in step 305 and proceeds to step 310.

In step 310, method 300 receives a signaling message for setting up a call to a customer. For example, the signaling gateway router servicing a customer receives a signaling message from the CCE for setting up a call to the customer.

In step 315, method 300 determines if the call is from a caller identified as a spammer. In one embodiment, the signaling gateway router may analyze the signaling message from the CCE to determine if the call is from a caller identified as a spammer. In another embodiment, the signaling gateway router may directly query an application server that identifies and maintains a list of spammers for the spammer information. If the call is from a spammer, the method proceeds to step 320. Otherwise, the method proceeds to step 380.

In step 320, method 300 determines one or more filter rules for handling calls for the customer. For example, the method may retrieve a customized list of filter rules for handling calls destined towards the customer.

In step 325, method 300 processes the call using the one or more filter rules for handling calls for the customer. For example, the method may block the call, forward the call to the customer, forward the call to the customer with spammer information (e.g., rating and/or category), forward to a recording system, etc.

In step 330, method 300 determines if the processing of the call comprised forwarding the call to the customer. For example, the processing may be forwarding the call with spammer information to be displayed on the customer's endpoint device. If the processing of the call comprised forwarding the call, the method proceeds to step 335. Otherwise, the method ends in step 390 or returns to step 310 to continue receiving signaling messages.

In step 335, method 300 determines if a feedback is received from the customer. For example, the customer may provide a feedback that indicates that the call is from a spammer. If a feedback is received from the customer, the method proceeds to step 340. Otherwise, the method ends in step 390 or returns to step 310 to continue receiving signaling messages.

In step 340, method 300 processes the feedback. For example, the signaling gateway router may initiate the processing of the feedback and the recording of the signaling message and/or content (e.g., voice content) in a call recording system provided in an edge access router used by the media path. For example, the voice and signaling packets from the calling party may be recorded for a more detailed analysis. Alternatively, the customer may be given a plurality of options to define the category of the spammer. For example, once the customer has indicated that a current call is a spam call, the signaling gateway router may present the customer with a plurality of choices to define the spam call (e.g., "please press 1 if the call was a telemarketer, please press 2 if the call was a charitable organization, please press 3 if the call was a political organization, and so on). The selection made by the customer can be broadly deemed to be input provided by the customer. It should be noted that other methods of receiving customer inputs can be implemented, e.g., receiving a verbal comment from the customer via a voice recognition module, and so on. The edge access router may then forward the recorded content and/or spam report to the application server maintaining the list of spammers. The method ends in step 390 or returns to step 310 to continue receiving signaling messages.

In step 380, method 300 processes the call in accordance with normal procedure. For example, the call may be forwarded towards the customer. The method ends in step 390 or returns to step 310 to continue receiving signaling messages.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
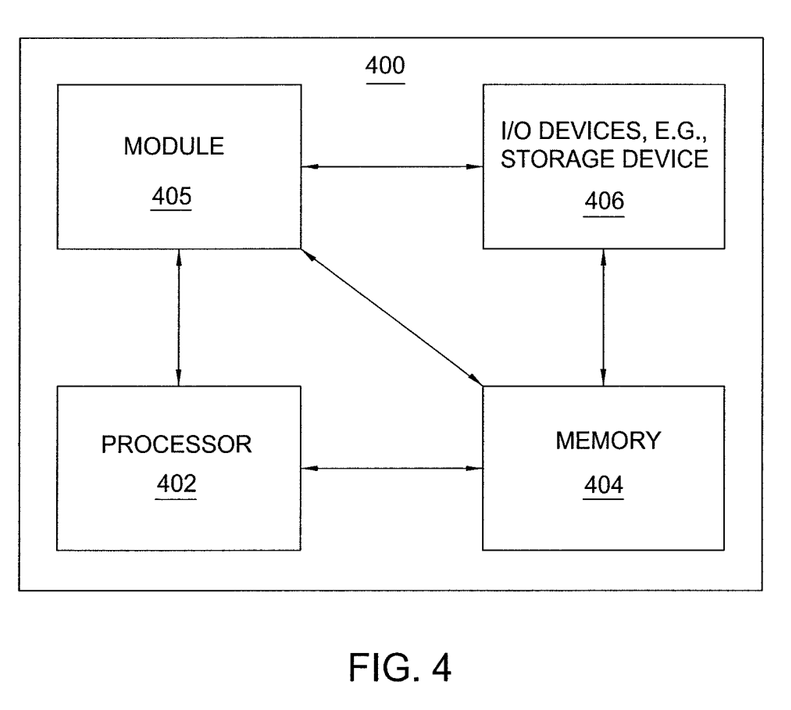
FIG. 4 illustrates a high level block diagram of a general purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing protection against spam, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing protection against spam can be loaded into memory 404 and executed by processor 402 to implement the functions as discussed above. As such, the present method 405 for providing protection against spam (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call, comprising:
   receiving, by a processor, a signaling message for setting up the call to an endpoint device of a customer;
   determining, by the processor, the call is from a caller that has been identified as being a spammer; and
   processing, by the processor, the call using a filter rule for the customer, when the caller has been identified as being a spammer, wherein the filter rule has been configured by the customer, wherein the filter rule specifies a call handling based upon a category of the spammer.

2. The method of claim 1, wherein the determining is performed by analyzing information contained within the signaling message.

3. The method of claim 1, wherein the determining is performed by sending a query to an application server that maintains a list of spammers.

4. The method of claim 3, wherein a response to the query comprises spammer information, wherein the spammer information comprises the category of the spammer.

5. The method of claim 1, further comprising:
   processing a feedback received from the customer, when the feedback is received from the customer.

6. The method of claim 5, wherein the processing the feedback comprises recording a plurality of voice packets from the call.

7. The method of claim 5, wherein the processing the feedback comprises recording a plurality of data packets from the call.

8. The method of claim 5, wherein the processing the feedback comprises recording an input provided by the customer.

9. The method of claim 1, wherein the spammer is identified by a foreign gateway.

10. The method of claim 1, wherein the signaling message for setting up the call is received by the processor of a signaling gateway router.

11. The method of claim 1, wherein the signaling message comprises a session initiation protocol signaling message.

12. A non-transitory computer-readable medium storing instructions which, when executed by a processor, cause the processor to perform operations for processing a call, the operations comprising:
   receiving a signaling message for setting up the call to an endpoint device of a customer;
   determining the call is from a caller that has been identified as being a spammer; and
   processing the call using a filter rule for the customer, when the caller has been identified as being a spammer, wherein the filter rule has been configured by the customer, wherein the filter rule specifies a call handling based upon a category of the spammer.

13. The non-transitory computer-readable medium of claim 12, wherein the determining is performed by analyzing information contained within the signaling message.

14. The non-transitory computer-readable medium of claim 12, wherein the determining is performed by sending a query to an application server that maintains a list of spammers.

15. The non-transitory computer-readable medium of claim 14, wherein a response to the query comprises spammer information, wherein the spammer information comprises the category of the spammer.

16. The non-transitory computer-readable medium of claim 12, wherein the operations further comprise:
   processing a feedback received from the customer, when the feedback is received from the customer.

17. The non-transitory computer-readable medium of claim 16, wherein the processing the feedback comprises recording a plurality of voice packets from the call.

18. The non-transitory computer-readable medium of claim 12, wherein the spammer is identified by a foreign gateway.

19. The non-transitory computer-readable medium of claim 12, wherein the signaling message for setting up the call is received by the processor of a signaling gateway router.

20. An apparatus for processing a call, comprising:
   a processor; and
   a computer-readable medium storing instructions which, when executed by the processor, cause the processor to perform operations, the operations comprising:
   receiving a signaling message for setting up the call to an endpoint device of a customer;
   determining the call is from a caller that has been identified as being a spammer; and
   processing the call using a filter rule for the customer, when the caller has been identified as being a spammer, wherein the filter rule has been configured by the customer, wherein the filter rule specifies a call handling based upon a category of the spammer.

* * * * *